Feb. 18, 1941.     G. A. LYON     2,231,930
WHEEL DISK CONSTRUCTION
Filed May 18, 1936
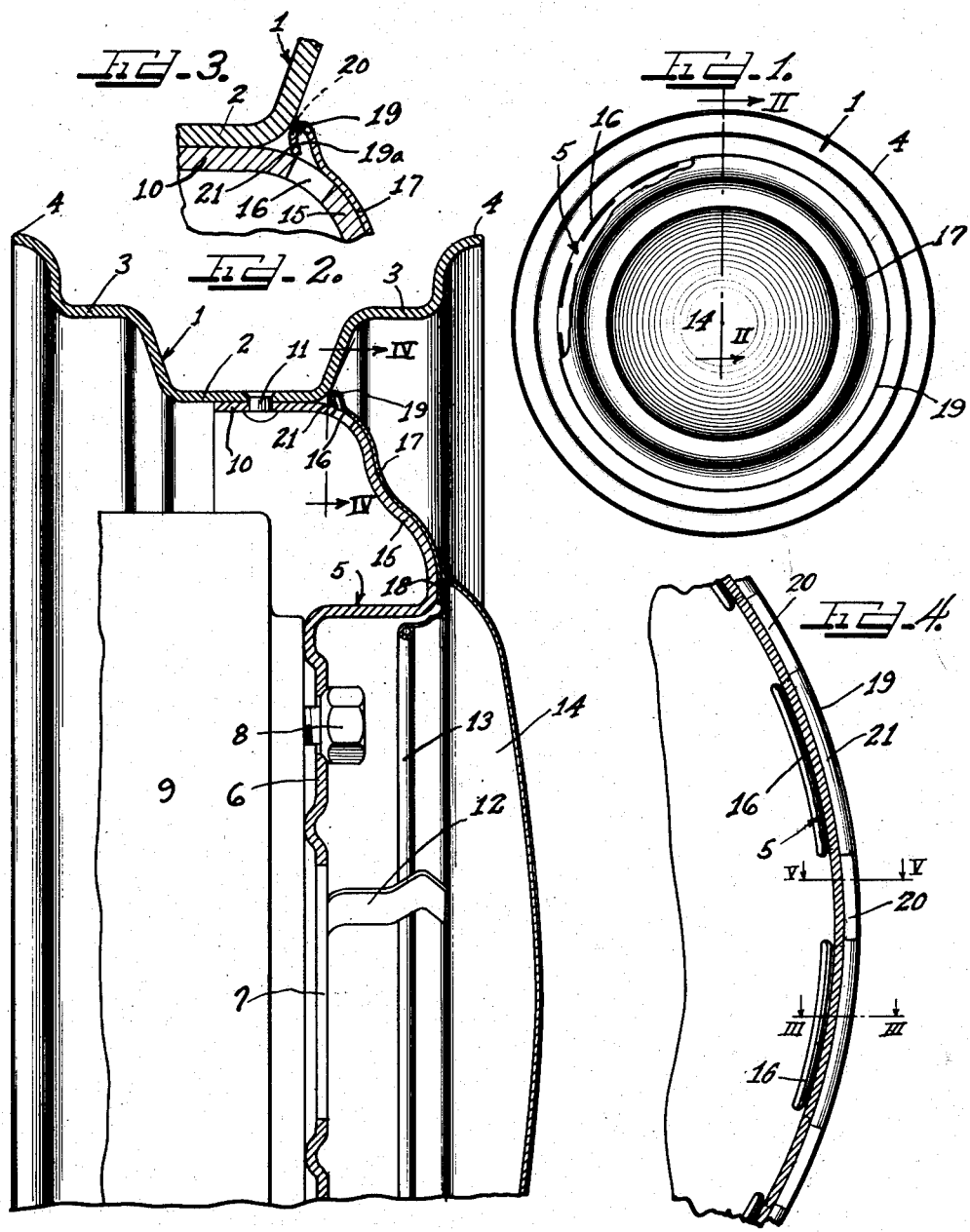
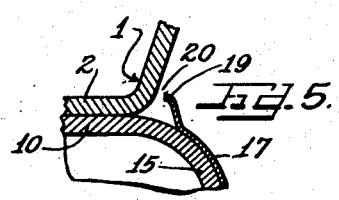
Inventor
GEORGE ALBERT LYON.

Patented Feb. 18, 1941

2,231,930

UNITED STATES PATENT OFFICE 2,231,930

WHEEL DISK CONSTRUCTION

George Albert Lyon, Detroit, Mich.

Application May 18, 1936, Serial No. 80,395

7 Claims. (Cl. 301—37)

This invention relates to improvements in a wheel disk construction, and more particularly to wheel disks of the character disposed over the outer side surface of a vehicle wheel to add to the attractiveness of the wheel and the vehicle as a whole and keep dirt and debris from collecting in cracks or joints or otherwise accumulating in the interior wheel construction.

In the manufacture of vehicle wheels, especially the metallic wheels which include a metal rim and a metal body part connected to the rim, it is preferable in many cases to provide apertures or openings in the body part of the wheel so that air may circulate directly through the wheel and thus cool the brake drum. With such a wheel, it is of course desirable to maintain the brake drum ventilation characteristics even though a wheel be equipped with a wheel disk.

With the foregoing in mind, it is an object of the present invention to provide a wheel disk for a vehicle wheel, which disk is also provided with ventilation openings in communication with those on the wheel to provide a complete air circulation path through the wheel.

Another object of the invention is the provision of a wheel disk having air circulation openings therein, with the structure of the disk such as to conceal said openings when the disk is viewed from the outer side thereof.

Still another object of the invention is the provision of a wheel disk having underturned means for bitingly engaging the wheel adjacent ventilation openings in the wheel, the disk also having ventilation openings therein adjacent the means in communication with the openings on the wheel.

Another feature of the invention is the provision of a wheel disk shaped to intimately overlie the body part of a vehicle wheel, wherein said body part has a tortuous or varying configuration.

Also a feature of the invention is the provision of a wheel disk having underturned means for engagement with the wheel to hold the disk thereon, the central portion of the disk extending inwardly to underlie the hub cap of the wheel, and the disk being provided with ventilation openings for communication with similar openings in the wheel structure.

A further object of the invention is the provision of a wheel disk having a plurality of underturned tooth-like projections for engagement with the wheel adjacent ventilation openings in the wheel, each projection being wider than the adjacent ventilation opening, and the disk also having ventilation openings therein and being constructed so as to provide free ventilation passages from the openings in the disk to those in the wheel.

Other and further objects and advantages of the present invention will become apparent from the disclosures hereinafter, taken in conjunction with the accompanying drawing, in which:

Figure 1 is a side elevational view of a vehicle wheel, minus the tire, equipped with a wheel disk embodying improvements of the present invention, showing parts broken away for the purpose of clarity;

Figure 2 is an enlarged vertical sectional view, with parts in elevation, of the structure shown in Figure 1, taken substantially as indicated by the line II—II of Figure 1;

Figure 3 is an enlargement of a portion of the upper right hand part of Figure 2 and is a section on the line III—III of Figure 4.

Figure 4 is a fragmentary vertical sectional view, taken substantially as indicated by the line IV—IV of Figure 2, looking in the direction of the arrows; and Figure 5 is a sectional view similar to Figure 3 but taken on the line V—V of Figure 4.

As shown on the drawing:

The illustrated embodiments of the present invention are each shown associated with a vehicle wheel including a rim of the drop center type, generally indicated by numeral 1, comprising a base flange 2, intermediate flanges 3—3, and side edges 4—4, all integrally connected in the usual manner.

The wheel also includes a body part, generally indicated by numeral 5 which is provided with the usual fastening flange 6, apertured as at 7 to provide a hub opening for the wheel. Outside the hub opening, the flange 6 is also provided with a series of apertures for the accommodation of fastening means such as bolts 8, by means of which the wheel may be fastened to a vehicle part, such as a brake drum 9 or a spare wheel carrier, as the case may be. The outer portion of the body part is turned inwardly to form a flange 10 attached to the base flange of the rim in any suitable manner, such as by rivets 11. This body part is further provided with a plurality of resilient retaining elements 12 projecting substantially in an axial direction from the wheel for engaging in snap-on fashion over the inner rolled edge 13 of a hub cap 14.

Between the fastening flange 6 and the rim engaging flange 10, the body part is provided with a tortuous or varying configuration, as indicated at 15, terminating in a shoulder against which a part of the hub cap may rest. Adjacent the rim, preferably in that region where the varying part 15 merges into the flange 10, the body part is provided with an annular series of elongated apertures 16 providing openings through which air may freely circulate to cool the brake drum 9.

With reference to Figures 1 to 4, inclusive, it will be seen that one of the illustrated forms of wheel disks includes a disk part 17, preferably made of metallic sheet material and, in this instance, shaped to intimately overlie the tortuous surface of the body part 15. The inner part of the disk portion is centrally apertured and extends, as indicated at 18, beneath the hub cap 14, which aids in holding this part of the disk in tight cooperation with the wheel. The outer margin of the disk 17 is underturned, as indicated at 19, to provide an interior channel 19a best seen in Figure 3. Portions of the underturned marginal parts are cut away to provide spaced openings 20 defining between adjacent openings a tooth-like element or projection 21. The annular series of projections 21 afford a biting engagement with the body part of the wheel when the disk is pressed axially into position upon the wheel. The engagement with the body part of the wheel is best illustrated in Figures 2 and 3, and it will be seen that the biting edges of the projections 21 occur immediately adjacent the series of apertures 16 in the body part of the wheel. It will also be noted from the showing in Figure 4 that each projection 21 is preferably of such size as to extend beyond the adjacent aperture or opening 16 so that it is impossible for the projections to catch inside the openings when placing the disk upon the wheel, and it is impossible for these projections to assume a position in the openings after the disk is on the wheel and thereby cause a loosening of the disk.

It will further be understood that while the projections 21 establish a biting engagement with the body part of the wheel, this biting engagement is not sufficient to prevent removal of the disk from the wheel, but the disk may be pried off the wheel with the use of a suitable pry-off tool. However, the biting engagement is sufficient to hold the disk firmly upon the wheel, against objectionable rattling, drumming or similar noises.

From the structure above described, it will be seen that while the disk is in position upon the wheel, the openings 20 in the disk are concealed when the disk is viewed from the outer side thereof, as seen in Figure 1. The disk thereby presents an external appearance of not having any openings or apertures therein, thereby adding to the appearance of the vehicle as a whole and at the same time providing adequate air circulation for the cooling of the brake drum. The air may circulate freely entirely through the wheel with the disk attached thereto, even though the openings in the disk are offset from the openings in the wheel, since the inner channel 19a formed in the disk establishes ample communication between the respective openings. There may be as many as desired of the openings in the wheel and the tooth-like projections 21 on the disk, fourteen being one satisfactory number.

Another desirable feature of the disk just described resides in the fact that while the disk is engaged with the body part of the wheel, it nevertheless extends radially outwardly sufficiently to cover the gap between the body part and rim of the wheel. From a close inspection of Figure 3 it will be noted that the space between the periphery of the disk 17 and the rim 1 is large enough to permit entrance of cooling air to slots 20. Further, the openings in the disk being offset from the ventilation openings in the wheel renders it more difficult for dirt and debris to clog the openings and also to pass therethrough and accumulate in the interior parts of the wheel 10 or brake drum.

From the foregoing, it is apparent that I have provided a novel wheel disk for attachment over the outer side surface of a vehicle wheel, which wheel disk provides for adequate ventilation of the wheel brake drum, which disk may be readily attached to the wheel, which lends attractiveness to the vehicle as a whole, permits a varying color scheme to be applied to the wheel in an economical manner, and which disk itself may be economically manufactured.

While I have shown particular embodiments of my invention, it will, of course, be understood that I do not wish to be limited thereto, since many modifications may be made, and I therefore contemplate by the appended claims to cover all such modifications as fall within the true spirit and scope of my invention.

I claim as my invention:

1. In combination, a vehicle wheel having a series of openings therein to permit air circulation, and an ornamental disk for attachment to said wheel over the outer side surface thereof and having a plurality of openings therein offset from the openings in the wheel, and means associated with the disk forming passages of restricted cross sectional area between the disk and wheel openings, whereby air is free to circulate through said disk and said wheel but the passage of debris and other foreign matter is greatly restricted.

2. In combination, a wheel having a metallic rim and a metallic body part with openings in said body part adjacent the rim to permit air circulation through the wheel, and an ornamental disk having means on the inner side thereof bitingly engaging the wheel adjacent said openings, and said disk also having openings therein in communication with the openings in the wheel in substantially circular alignment with said biting means.

3. In combination, a vehicle wheel having openings therein to permit air circulation through the wheel to cool the brake drum, and an ornamental wheel disk made of sheet material and having an underturned portion engaging with the wheel, said underturned portion being provided with openings in communication with those in the wheel, and the outer part of the disk being shaped to conceal the openings in said underturned part.

4. In combination, a vehicle wheel including a rim and a metallic body part having a tortuous configuration, a hub cap for the wheel, and an ornamental disk made of sheet material shaped to intimately overlie the body part of the wheel, the inner part of the disk underlying said hub cap, and the outer part of the disk carrying underturned means for biting engagement with the wheel body part.

5. In combination, a vehicle wheel including a rim and a solid metallic body part, said body part having a series of spaced openings adjacent the rim to provide ventilation for the brake drum, said body part extending generally axially outwardly in the region of said openings, and an ornamental disk carrying spaced inturned tooth-like elements engaging with said body part adjacent said openings and provided with alternately spaced ventilating openings, each of said elements being wider than each adjacent opening in said body part.

6. In combination, a vehicle wheel including a a rim and a substantially solid metallic body part, said body part having a series of spaced relatively small openings adjacent the rim to provide ventilation for the brake drum, said body part extending axially outwardly in the region of said openings, and an ornamental disk carrying spaced inturned tooth-like elements engaging with said body part adjacent said openings, each of said elements being wider than the adjacent opening, and said disk having openings therein in communication with the wheel openings.

7. In a wheel structure including a wheel having rim and body parts, an ornamental trim ring for one of said parts having a marginal portion provided with resilient snap-on retaining means projecting therefrom so as to be in close proximity to one of said wheel parts, and retainingly gripping the other part to hold the trim ring on the wheel, said retaining means comprising a plurality of spaced resilient rearwardly extending projections turned radially inwardly and having their extremities in biting engagement with an outer surface of said body part in proximity to the junction of said rim and body parts.

GEORGE ALBERT LYON.